Jan. 23, 1962   W. H. LOCKWOOD   3,018,003
REVERSIBLE AND TILTABLY NESTABLE CONTAINERS
Filed July 8, 1960   2 Sheets-Sheet 1
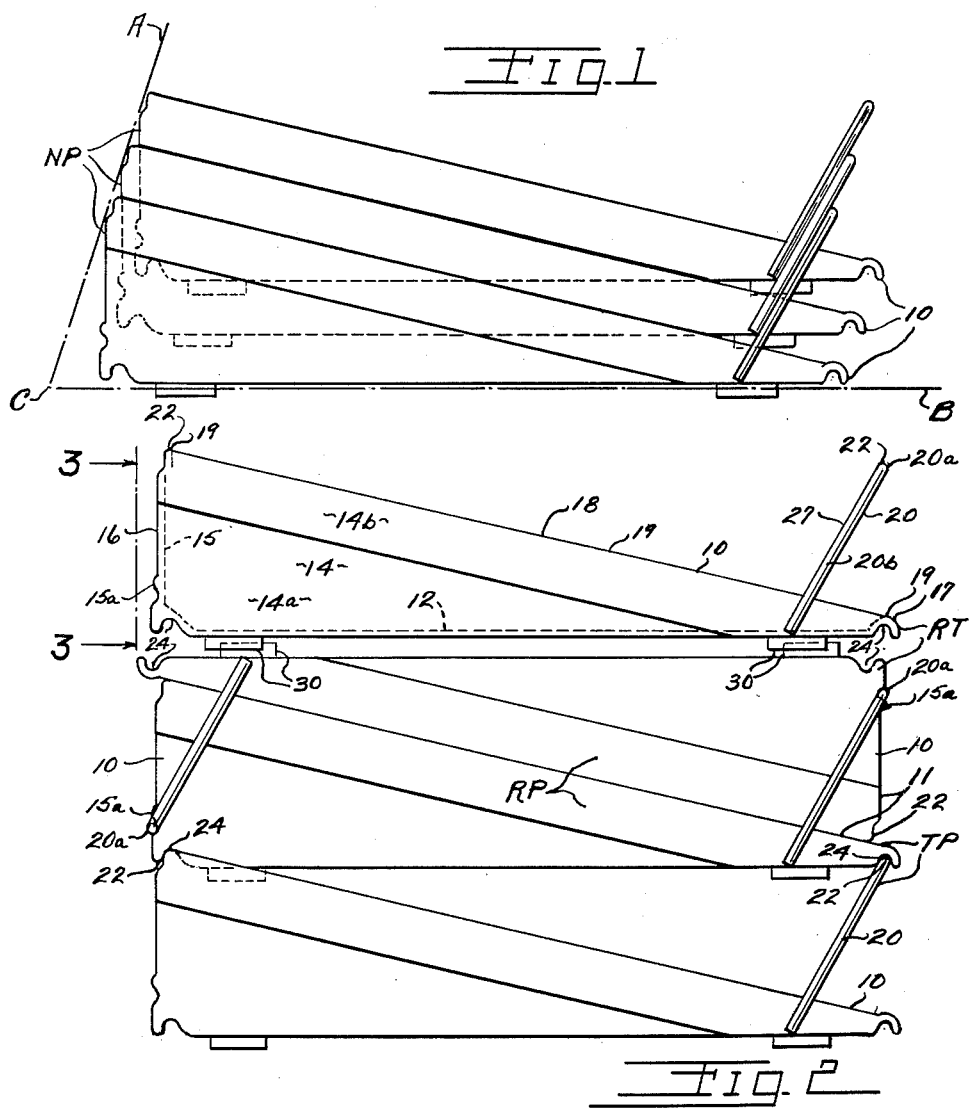
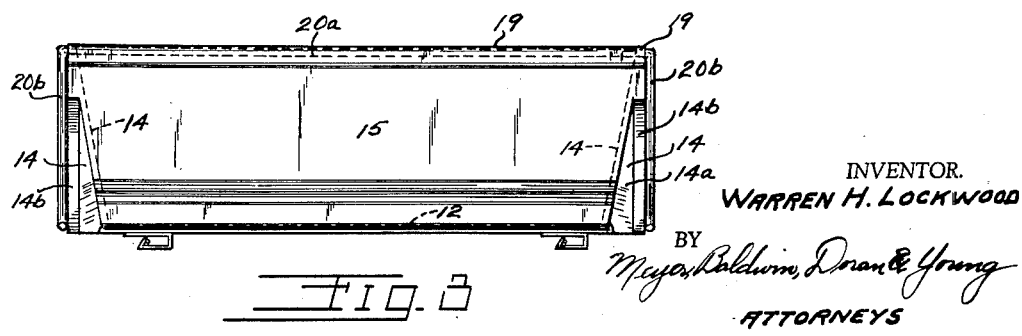
INVENTOR.
WARREN H. LOCKWOOD
BY
ATTORNEYS Jan. 23, 1962 W. H. LOCKWOOD 3,018,003
REVERSIBLE AND TILTABLY NESTABLE CONTAINERS
Filed July 8, 1960 2 Sheets-Sheet 2

INVENTOR.
WARREN H. LOCKWOOD
BY
Meyer, Baldwin, Doran & Young
ATTORNEYS

's patent head

United States Patent Office 3,018,003
Patented Jan. 23, 1962

3,018,003
REVERSIBLE AND TILTABLY NESTABLE CONTAINERS
Warren H. Lockwood, 1329 Granvia Altamira, Palos Verdes Estates, Calif.
Filed July 8, 1960, Ser. No. 41,585
13 Claims. (Cl. 211—126)

This invention relates to improvements in trays or receptacles, and more particularly to that type tray adapted to form a receptacle by coacting with an upside down like tray, to nest with like trays when empty, and to tier with like trays to form a generally vertically aligned tier of right-side-up trays or receptacles.

Whenever in the specification and claims these trays are referred to as "trays," it is intended that this term includes crates, boxes, baskets, trays, skids, pallets, flats and similar article carrying devices which may form receptacles and which trays have at least one open side. Whenever in the specification and claims the term "receptacle" is used, it is intended to define a structure composed of two such trays, one upside down with respect to the other, with the open sides facing each other.

An object of the present invention is to provide a tray having one high side, one low side, and a bail extending above said low side.

A further object of the present invention is to provide a tray, for tiering and nesting with like right-side-up trays, for forming a receptacle by coacting with an upside down like tray, and for tiering receptacles thus formed.

A further object of the present invention is to provide a tray having a common portion for engaging a like tray in receptacle forming, nesting, and tiering positions, and especially wherein this common portion is at least one part of a bail.

A further object of the present invention is to provide a tray characterized by its inexpensive manufacturing cost, strong and sturdy nature, structural simplicity, compactness in nesting and receptacle forming positions with like trays, ease of manufacture, multiplicity of functional advantages, and/or ease of assembly with like trays in tiering, nesting or receptacle forming positions.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

FIG. 1 is a side elevational view of a group of like trays in nesting position;

FIG. 2 is a side elevational view of a group of like trays with some trays in tray tiering position, receptacle forming position and receptacle tiering position;

FIG. 3 is an end view of a single tray, taken generally along the line 3—3 in FIG. 2 of the end of a single tray;

FIG. 5 is an end view of the top trays in FIG. 2 showing in detail the receptacle tiering support elements and being taken generally along the line 5—5 in FIG. 4; while

Figure 4:
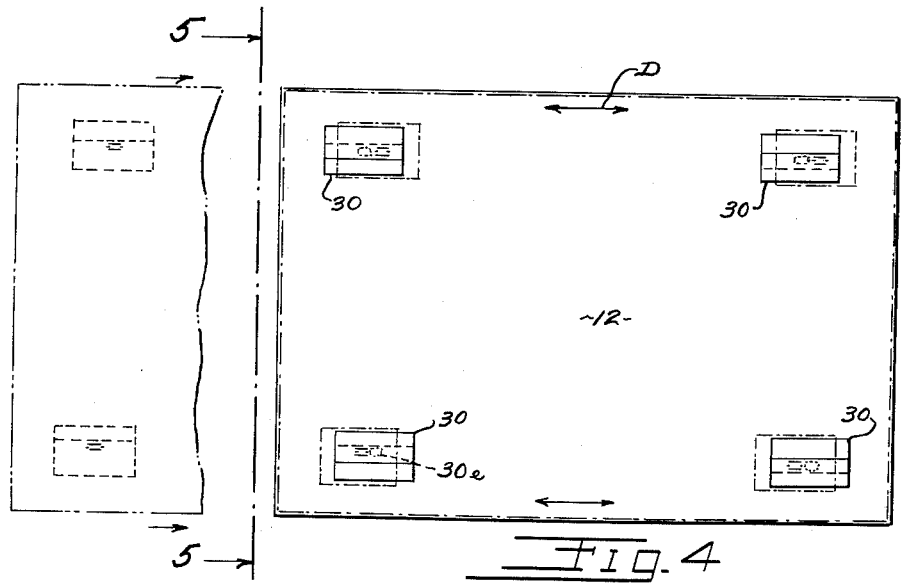
FIG. 4 is a schematic top view showing the top surface of the bottom tray in FIG. 5 in solid line position and the bottom surface of the top tray in FIG. 5 in double dot-dash line position when laterally offset and in dot-dash line position when vertically aligned in the receptacle tiering position in FIG. 5.

Before the trays and receptacles here illustrated are specifically described, it is to be understood that the invention here involved is not limited to the structural details or arrangement of parts here shown since trays and receptacles embodying the present invention may take various forms. It is also to be understood that the phraseology or terminology herein employed is for purposes of description and not of limitation since the scope of the present invention is denoted by the appended claims.

Trays 10 in FIGS. 1 and 2, wherein each tray is of like construction, are adapted to be moved by manipulation into tray nesting position NP in FIG. 1, tray tiering position TP in FIG. 2, receptacle forming position RP wherein receptacle 11 is formed from two like trays 10, or receptacle tiering position RT.

Each tray 10 is a pallet-like unit having rigidly connected together bottom load supporting part 12 of any suitable shape, such as a sheet generally square or rectangular in horizontal plan view; two side parts 14 extending generally parallel, triangular in shape, similarly oriented, located on opposite sides of bottom part 12, and projecting upwardly from bottom part 12 to form one tray high side 16 and one tray low side 17; and sheet-like side part 15 connecting side parts 14 and extending across tray high side 16. Each side part 14 has a downwardly and inwardly tapered outer surface 14a and has rib 14b integrally located at the top of surface 14a. These side parts 14 and 15, and this bottom part 12, form with their four framing top edges 19 arranged in rectangular outline, open top side 18 of tray 10 through which articles may be placed downwardly onto bottom part 12 for storage, shipment or display. A spring steel bail 20, of generally inverted U-shape, has its horizontal arm 20a extending generally parallel to bottom part 12 over tray low side 17 and has the lower distal ends of its arms 20b straddling ribs 14b and rigidly secured thereto in any suitable manner. This projecting part or bail 20 has its horizontal arm 20a located at a height generally the same as the top edge of side part 15 on tray high side 16. The upper edge parts of tray 10 include some of the arms of bail 20 and of the framing top edges 19.

Although bail arm 20a extends horizontally clear across bottom part 12 to connect vertical bail arms 20b, it will be apparent hereinafter that like trays will have the same mode of interaction described herein when bail 20 includes only two inverted L-shaped members located one at each end of tray low side 17 with the upper, horizontal arms thereof coaxially aligned but not connected.

Two like trays 10 are easily moved into tray tiering position TP in FIG. 3. Each tray 10 includes two, parallel, upper tray tiering support elements 20 rigidly connected with one on the top edge 19 on side parts 15 and the other on bail arm 20a, and includes two parallel grooves or lower tray tiering support elements 24 rigidly connected to and formed in the bottom surface of bottom part 12 with upper elements 22 being each vertically directly above a corresponding lower element 24. Tiering means or upper elements 22 extend over tray low side 17 and over tray high side 16. Tray tiering position TP in FIG. 2 is reached by lowering upper tray 10 in position TP until lower elements 24 of this upper tray engage and rest upon the corresponding upper elements 22 of the lower like tray to maintain these trays in tiering position TP with the bottom parts 12 of the two trays in horizontal orientation, with the perimeter of the trays vertically aligned, and with all trays 10 right-side-up. This tray tiering position TP may be assumed with the two trays 10 in like orientation, as shown in FIG. 2, or with the upper tray turned 180 degrees about a vertical central axis and then lowered into tray tiering position because the two upper elements 22 on the lower tray are parallel and the two lower elements 24 on the upper tray are also parallel. In either of these two positions, tiered trays 10 may be used as a display rack for sales purposes of articles supported in vertical spaced apart relationship on their respective bottom parts 12. In either of these tray tiering positions, the inner surface of parallel side parts 14 on the lower tray closely straddle the outer surface of parallel side parts 14 on the upper tray to prevent lateral shift of the upper tray relative to the lower tray parallel to the direction of elements 22 and 24 (perpendicular to the plane of the drawings in FIG. 2).

A plurality of like trays 10 may be moved into tray nesting position NP in FIG. 1 by suitable relative approach movement of their bottom parts 12. A clearway 27 is provided in each tray 10 between bottom part 12; upper edge parts 19, 20a and 20b; and side parts 14, 15 and 20b downwardly from the upper tiering support element 22, formed by horizontal arm 20a. It should be apparent that an upper tray may be moved downwardly into nesting position NP with a lower like tray by tilting the upper tray downwardly toward the right in FIG. 1 from a like horizontal orientation position until lower right element 24 (corresponding to upper element or arm 20a on the lower tray) on the upper tray is entered by manipulation into clearway 27 by sequentially a downward movement and a shifting movement toward the right in FIG. 1. Then, lower elements 24 of upper tray 10 may pass downwardly in clearway 27 of the lower tray to nesting position NP in the lower tray by this rocking movement. Then, trays 10 are held against horizontal relative movement in position NP by interengagement of bails 20, ribs 14b, and of inner and outer surfaces on side parts 14 and 15, which surfaces 14a on parts 14 are downwardly and inwardly tapered in FIG. 3.

In nesting position NP in FIG. 1, it should be noted that as trays 10 nest, progressively upwardly located trays move forward toward the right in FIG. 1 a certain distance along line A. This would seem to make the nested stack top heavy as the trays got higher and higher so that the stack would fall over toward the right. However, this nested stack in FIG. 1 can be made to go straight up by putting this nested stack on a dolly having intersecting top surfaces along the lines A and B with the vertical line of the dolly extending through intersection C located somewhere between the acute angle formed by these lines.

Also, trays 10 could be made to nest in a stack going straight up by providing an outward slope in the upward direction to side part 15 of each tray so that upper elements 22 on part 15 on all the trays in the nested stack would be in vertical alignment in nesting position NP.

Two like trays are adapted to be moved into receptacle forming position RP in FIG. 2 with the upper and lower trays 10 in FIG. 2 removed. This receptacle 11, composed of two like trays 10, forms a closed cavity of value in shipping many different products, such as products needing protection. Receptacle 11 is formed by placing upper tray 10 in position RP in FIG. 2 slightly above the lower tray, lowering the upper like reverse upside down tray with its upper tiering support element 22 on side part 15 entering downwardly into clearway 27 after which this upper tray may pass downwardly in this clearway 27 into the receptacle forming position RP with the lower tray shown in FIG. 2. Each tray 10 has bail 20 forming one tray end portion having opening or clearway 27 larger than the outer periphery of the other tray end portion at end 16 so that this other end portion, with its upper tiering element 22, will fit inside this one end portion on a like tray in position RP. In position RP, four framing top edges 19, bail 20, and lock surface or hump 15a on side part 15 engage on the like trays and form respectively identical receptacle forming support parts on each tray, such as lower tray 10 in position RP, rigid with and located on the top side of bottom part 12 of the lower tray. This receptacle 11, formed by these two coacting trays 10 in position RP, having among these receptacle forming support parts the four framing top edges 19 serving as receptacle forming edge parts, located generally on the surface of a right parallelepiped having one face thereof coplanar with bottom part 12, and forming the sealing edges around the cavity within receptacle 11. As upper tray 10 is moved toward the position RP in FIG. 2, spring steel bail 20 on each tray resiliently snaps over lock surface 15a on the other tray to lock the trays 10 in receptacle forming position RP. This locking action is provided by arms 20a of bails 20 engaging lock surfaces 15a as receptacle forming support parts. Bail vertical arms 20b on one tray straddle the outer surfaces of side parts 14 on the associated like tray in position RP to prevent horizontal lateral relative movement therebetween in the direction perpendicular to the plane of the drawing in FIG. 2.

It should be noted that bail 20, and especially horizontal arm 20a thereof, provides a common portion for engaging a like tray in receptacle forming position RP in FIG. 2 as some of the receptacle forming support parts, in tiering position TP in FIG. 2 as some of the tray tiering support elements, and in nesting position NP in FIG. 1.

Figure 5:
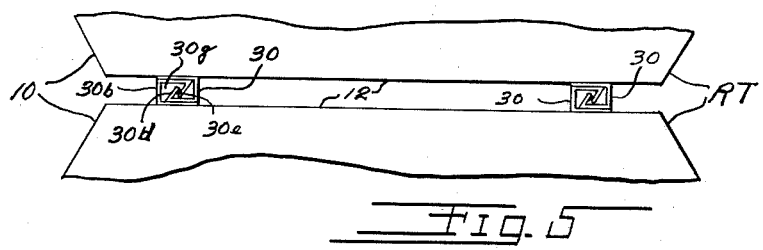

A plurality of receptacles 11 thus formed are adapted to be supported in receptacle tiering position, as partially shown by interengaged trays 10 in position RT in FIGS. 2 and 5, with the perimeters of the receptacles 11 and trays 10 generally vertically aligned. Each tray 10 has a plurality, here shown as four in number, of receptacle tiering support elements 30 rigidly secured to the bottom surface of bottom part 12 and adapted to engage and rest upon corresponding receptacle tiering support elements of a second like receptacle in receptacle tiering position RT with bottom parts 12 of the receptacles in horizontal orientation. Although any suitable receptacle tiering support elements may be provided for this purpose, four elements 30 of a specific form are shown herein for illustrative purposes.

Figure 6:
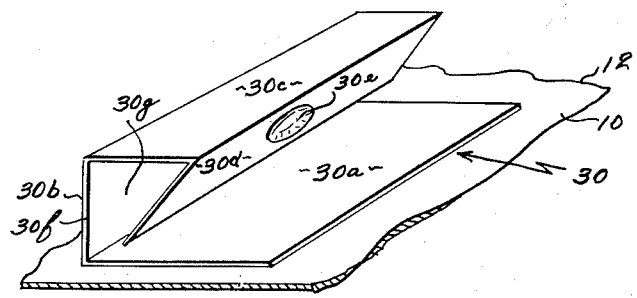
FIG. 6 is an enlarged perspective view of one of the receptacle tiering support elements useable, in the manner shown in FIGS. 4 and 5, in FIG. 2.

Each element 30 includes integrally connected together, and preferably made of resiliently yieldable spring steel, a securement flange 30a in FIG. 6 secured to the bottom part 12, a vertically extending portion 30b, a horizontally extending portion 30c, and a turned-in portion 30d. These four elements or parts 30 are secured to base part 32, as shown by the solid line positions in FIG. 4, so that corresponding portions on all four elements are arranged along parallel lines extending parallel to horizontal direction line D. It should be noted in the solid line positions that the two upper elements 30 in FIG. 4 are displaced slightly to the left of the vertical with respect to the two lower parts in FIG. 4, the upper parts are in horizontal alignment, and the lower parts are in horizontal alignment parallel to line D. Each portion 30d in FIG. 6 has a bump 30e thereon forming a projection portion receivable in channel 30g on a similar tray forming a projection receiving portion.

Now, it should be apparent that if lower receptacle 11 in FIG. 5 is in the solid line position in FIG. 4, upper receptacle 11 in FIG. 5 may be slid horizontally from the double dot-dash line position in FIG. 4 in direction D to the dot-dash line position, which is the position RP shown in FIGS. 2 and 5. This action takes place by relative linear movement in direction D in FIG. 4 between one tray, and a reversed or upside down like tray, in FIG. 5. This action causes the bumps 30e of the upper tray to move past the corresponding bumps on the lower tray in the upper left-hand corner and the upper right-hand corner in FIG. 4 by a snap action while the bumps on the lower left-hand corner and the lower right-hand corner in FIG. 4 on the upper tray approach the corresponding bumps on the lower tray. Then, the upper and lower trays 10 are firmly locked in receptacle tiering position RT. It should be apparent that upper tray 10 may approach the lower tray from the right-hand side in FIG. 4 and can then be moved into locking position by movement in the direction opposite to direction D. Also, it should be apparent that the upper tray may be turned end for end through a 180 degree turn about a vertical axis, and then it can be interlocked with the lower tray, as shown in FIG. 4, by movement in direction D or in the opposite direction. In any situation, bumps 30e will interlock in basically the same manner.

Various changes in details and arrangement of parts can be made by one skilled in the art without departing from either the spirit of this invention or the scope of the appended claims.

What is claimed is:

1. A tray adapted for tiering and nesting with trays of like construction comprising a bottom load supporting part, upper edge parts, and side parts rigidly connected with said bottom part and with said upper edge parts, said bottom load supporting part and upper edge parts and side parts including upper tray tiering support elements rigidly connected with said upper edge and side parts, said bottom load supporting part and upper edge parts and side parts including lower tray tiering support elements rigidly connected with said side parts and said bottom part, said upper support elements being each vertically directly above a corresponding lower support element, said parts and elements being so constructed that the lower support elements of one tray are adapted to engage and rest upon the corresponding upper support elements of a second like tray with the bottom parts of the two trays in horizontal orientation in tray tiering position with the perimeter of said first tray vertically aligned directly above the perimeter of said second tray, there being one clearway provided between said bottom load supporting part and upper edge parts and side parts downwardly from one of said upper support elements and enterable by said corresponding lower support elements of an upper like tray in like orientation only by manipulation after which said lower support elements of said upper tray may pass downwardly in said clearway to a nested position in said lower tray, and said parts being so constructed and arranged that the parts of an upper tray nest with like parts of a lower tray in like orientation, said clearway being dimensioned so that it is enterable by an upper tiering support element of an upper like upside down tray after which said upper like tray may pass downwardly in said clearway into receptacle forming position with the lower tray.

2. A tray, as set forth in claim 1, with receptacle tiering support elements rigid with said bottom part and adapted to engage and rest upon corresponding receptacle tiering support elements of a second like receptacle with the bottom parts of the two receptacles in horizontal orientation in receptacle tiering position with the perimeters of said receptacles generally vertically aligned.

3. A tray, including a bottom part for load support, side parts rigidly connected with said bottom part, said side parts including two generally parallel extending similarly oriented triangular shaped side parts located on opposite sides of said bottom part to form one tray high side and one tray low side, and a bail rigid with some of said parts and extending over said tray low side.

4. A tray, as set forth in claim 3, with a lock surface constructed and arranged to be engaged by said bail on an upside down like tray to lock said trays in receptacle forming position.

5. A tray, including a bottom part for load support side parts rigidly connected with said bottom part, said side parts including two generally parallel extending similarly oriented triangular shaped side parts located on opposite sides of said bottom part to form one tray high side and one tray low side, and tiering means rigid with some of said parts and extending over said tray low side and over said tray high side for engaging and supporting a like tray in tiering position with the bottom parts of the two trays in generally horizontal orientation.

6. A tray, including a bottom part for load support, side parts rigidly connected with said bottom part, said side parts being constructed to form on opposite ends of said bottom part one tray high side and one tray low side, and a projecting part rigid with some of said parts and extending over said tray low side to a height generally the same as said high side, said parts being constructed and arranged so that said tray will form with an upside down like tray a receptacle having a height substantially less than twice the height of one tray.

7. A tray, as set forth in claim 6, with said parts being constructed and arranged so that like trays correspondingly positioned are movable by approach movement of said bottom parts into nesting position.

8. A tray, as set forth in claim 6, with said parts including generally vertically aligned upper and lower tiering support elements, whereby the lower support elements of one tray are adapted to engage and rest upon the corresponding upper support elements of a second like tray with the bottom parts of the two trays in horizontal orientation in tray tiering position with the perimeter of said first tray vertically aligned directly above the perimeter of said second tray.

9. A tray, constructed for forming a receptacle by coacting with an upside down like tray and for tiering with similarly positioned like trays wherein like trays have tiering support elements engaging in tiering position and have identical receptacle forming support parts engaging in receptacle forming position, said tray including a bottom part for load support, side parts rigidly connected with said bottom part and projecting to one side of said bottom part, receptacle forming support parts rigid with some of said parts and located on said one side of said bottom part, and tray tiering support elements rigid with some of said parts, whereby said receptacle forming support parts of coacting one tray and an upside down like tray are adapted to mutually engage to form a receptacle from these coacting trays, and whereby said tiering support elements of like trays are adapted to engage to maintain similarly positioned like trays in tiering position with their bottom parts generally in corresponding horizontal orientation.

10. A tray, as set forth in claim 9, with said receptacle forming support parts and said tray tiering support elements having a common portion for engaging a like tray in receptacle forming position and in tiering position.

11. A tray constructed for forming a receptacle by coacting with an upside down like tray wherein like trays have identical receptacle forming support parts engaging in receptacle forming position, including a bottom part for load support, side parts rigidly connected with said bottom part and projecting to one side of said bottom part, receptacle forming support parts rigid with some of said parts and located on said one side of said bottom part, said receptacle forming support parts including four receptacle forming edge parts located generally on the surface of a right parallelepiped having one face thereof coplanar with said bottom part, whereby said receptacle forming support parts and edge parts of coacting one tray and an upside down like tray are adapted to mutually engage in a receptacle forming position to form a receptacle from these coacting trays, some of said parts including end portions rigid with and located at each of two opposite ends of said bottom part, one end portion having an opening larger than the outer periphery of the other end portion so that the other end portion of one tray will fit inside said one end portion on a like tray in receptacle forming position.

12. A tray, as set forth in claim 11, with lock means on said end portions constructed and arranged to detachably engage in said receptacle forming position to lock together said like trays contiguous to opposite ends thereof.

13. A tray, as set forth in claim 11, wherein like trays have tiering support elements engaging in tiering position, said tray including tray tiering support elements rigid with some of said parts whereby said tiering support elements of like trays are adapted to engage to maintain like trays in tiering position with their bottom parts generally in horizontal orientation, said tray tiering support elements including at least two upper tiering support elements, each of said end portions including one of said upper tiering support elements.

References Cited in the file of this patent

UNITED STATES PATENTS

| | | |
|---|---|---|
| 2,487,168 | Mordkin | Nov. 8, 1949 |
| 2,641,383 | Coursey | June 9, 1953 |